United States Patent
Sumesaglam et al.

(10) Patent No.: US 7,620,134 B2
(45) Date of Patent: Nov. 17, 2009

(54) CIRCUIT TO SYNCRHONIZE THE PHASE OF A DISTRIBUTED CLOCK SIGNAL WITH A RECEIVED CLOCK SIGNAL

(75) Inventors: Taner Sumesaglam, Folsom, CA (US); Aaron K. Martin, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 11/510,959

(22) Filed: Aug. 28, 2006

(65) Prior Publication Data

US 2008/0049883 A1      Feb. 28, 2008

(51) Int. Cl.
    *H04L 7/00* (2006.01)
(52) U.S. Cl. ..................................................... 375/355
(58) Field of Classification Search ................. 375/355, 375/356, 359, 371, 373
    See application file for complete search history.

(56) References Cited

U.S. PATENT DOCUMENTS

| | | | |
|---|---|---|---|
| 6,901,126 B1 * | 5/2005 | Gu | 375/355 |
| 7,325,175 B2 * | 1/2008 | Momtaz | 714/704 |
| 7,526,049 B2 * | 4/2009 | Kushiyama | 375/326 |
| 2004/0170244 A1 * | 9/2004 | Cranford et al. | 375/373 |
| 2005/0238093 A1 * | 10/2005 | Payne et al. | 375/224 |

* cited by examiner

*Primary Examiner*—Don N Vo
(74) *Attorney, Agent, or Firm*—Seth Z. Kalson

(57) ABSTRACT

A circuit to synchronize the phase of a distributed clock signal to a received clock signal. Embodiments include a control loop comprising a phase interpolator, a clock distribution network, and a data receiver. The clock distribution network provides a sampling clock signal to clock the data receiver. The data receiver receives as its input the received clock signal. Control logic maps a subset of the output samples to a value, and this value is added to the phase introduced by the phase interpolator to provide an updated phase. Embodiments include a second phase interpolator and a second distribution network to clock a second data receiver, where the second data receiver receives the data. The control logic adjusts the second phase interpolator in the same way that it adjusts the phase interpolator. The two data receivers are matched to each other, and the two clock distribution networks are matched to each other. Other embodiments are described and claimed.

25 Claims, 3 Drawing Sheets

CIRCUIT TO SYNCRHONIZE THE PHASE OF A DISTRIBUTED CLOCK SIGNAL WITH A RECEIVED CLOCK SIGNAL

FIELD

Embodiments of the present invention relate to circuits that may be used in electrical computers and digital processing systems, and more particularly, to circuits to synchronize the phase of a distributed clock signal to a received clock signal.

BACKGROUND

For some chip-to-chip communication schemes, forwarded clock signaling is used, whereby a clock signal for sampling data is transmitted along with the data. By transmitting the clock signal along with the data, noise introduced by the communication channel, such as phase jitter, is often common to both the clock signal and the data, so that transitions in the received clock signal still lie within the eye of the received data.

For some communication channels, multiple bits of data are transmitted over a plurality of transmission lines during each clock cycle. A clock receiver on the receiving chip receives the clock signal, and the output of the clock receiver is distributed to various functional units on the receiving chip. Such functional units include the various data receivers on the receiving chip for receiving the multi-bit data. A clock distribution network, such as one or more clock trees, may be used to distribute the output of the clock receiver. This is illustrated in FIG. 4, where a clock signal and data are transmitted from transmitting chip 402 to receiving chip 404 by way of transmission lines 406 and 408. The clock signal is received by clock receiver 410, and distributed by clock tree 412 to data receiver 414.

It is desirable for the distributed clock signal to be in phase with the received clock signal, so that the received data at the various data receivers are sampled within the eye of the data. This may be accomplished during an initialization, or training period, in which delay lines and phase interpolators are utilized in the clock distribution path, and are adjusted so that the distributed clock signal matches the received clock signal. However, after initialization, there may very likely be variations in the temperature and supply voltage that affect the performance of the clock distribution network, as well as the delay line and the phase interpolators. As a result, it may happen that the distributed clock signal is no longer well matched in phase to the received clock signal, and this may result in data detection errors. This may be especially acute in high performance systems.

It is desirable and useful to adjust a clock signal distributed on an integrated circuit by way of a clock distribution network so that it stays in phase with a received clock signal, even if the characteristics of the clock distribution network change due to temperature, supply voltage, or other variables.

DESCRIPTION OF EMBODIMENTS

In the descriptions that follow, the scope of the term "some embodiments" is not to be so limited as to mean more than one embodiment, but rather, the scope may include one embodiment, more than one embodiment, or perhaps all embodiments.

Figure 1:
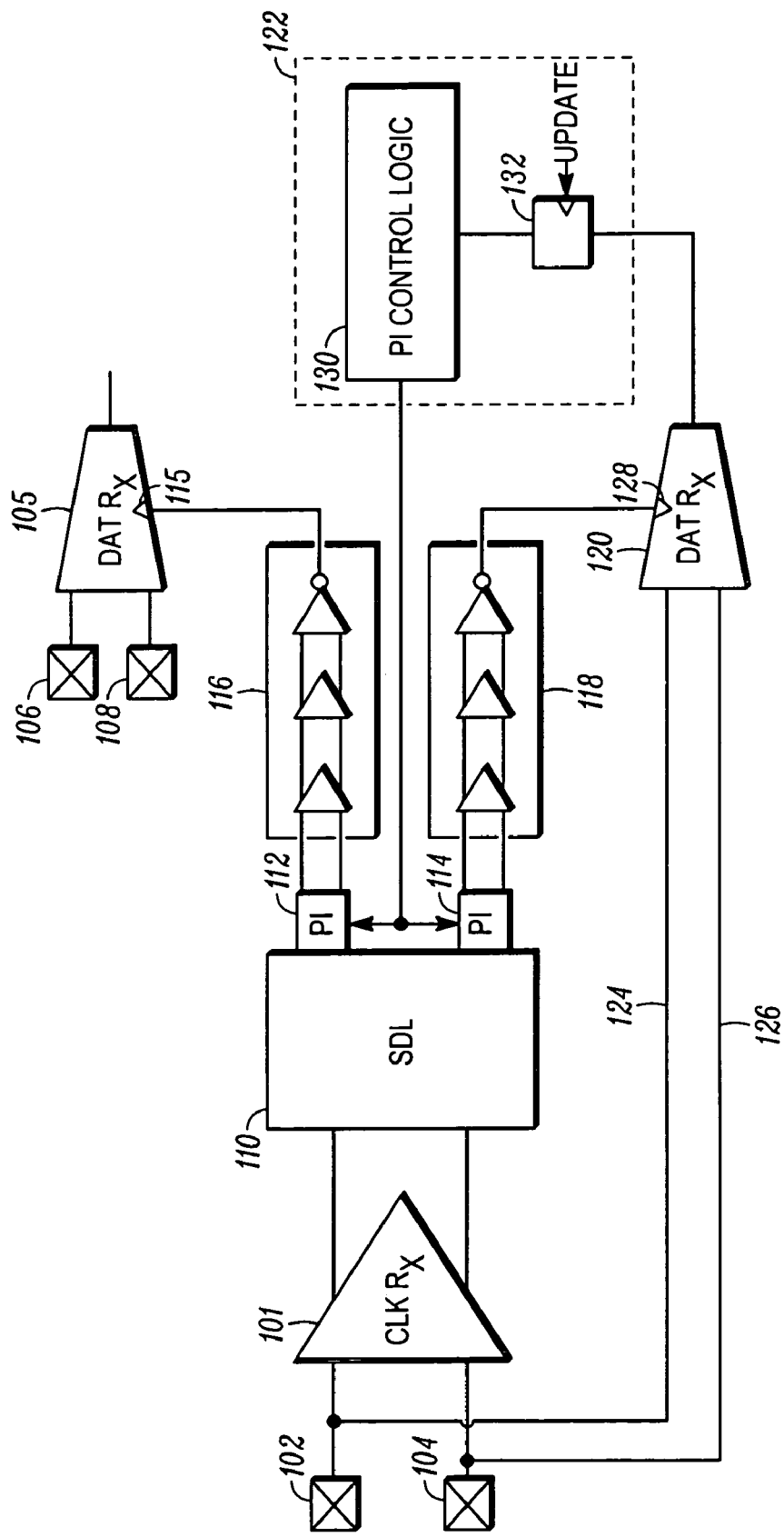
FIG. 1 illustrates an embodiment of the present invention.

FIG. 1 illustrates an embodiment of the present invention, comprising clock receiver 101 to receive a differential clock signal on pads 102 and 104, and data receiver 105 to receive a differential data signal on pads 106 and 108. Pads 102 and 104 may be regarded as the input ports to clock receiver 101, and pads 106 and 108 may be regarded as the input ports to data receiver 105.

Functional unit 110 is a slave delay line. Slave delay line 10 comprises multiple delay elements, and generates a multi-phase differential clock signal based upon its input differential clock signal. The input differential clock signal to slave delay line 110 is the output differential signal of clock receiver 101. Let $X(t)$ denote the input differential clock signal to slave delay line 110 (the output differential clock signal from clock receiver 101), where $X(t)$ has period T. Then, slave delay line 110 provides N periodic differential signals $X_n(t)$ of period T, where $n=1, 2, \ldots, N$, and where $X_n(t)=X(t+nT/N)$ for $n=1, 2, \ldots, N$. Note that each signal $X_n(t)$ is a phase-shifted version of $X(t)$, where the phase shift, in radians, is $(n/N)2\pi$.

Phase interpolators 112 and 114 provide an interpolation function, so that phase-shifted versions of the clock signal $X(t)$ for phase shifts other than $(n/N)2\pi$, $n=1, 2, \ldots, N$, may be realized. That is, given the two input differential signals $X_n(t)$ and $X_{n+1}(t)$, for $n=1, 2, \ldots, N-1$, a phase interpolator provides a differential signal $X(t+(T/2\pi)\theta)$, where the phase $\theta$ is in the range:

$$(2\pi)(n/N) \leq \theta \leq (2\pi)[(n+1)/N].$$

We may refer to the differential signal $X(t+(T/2\pi)\theta)$ as a phase-interpolated clock signal.

For differential signals, the variable $X(t)$ may be thought of as a two dimensional vector, or pair, $\{X1(t), X2(t)\}$, where $X1(t)$ and $X2(t)$ are the components that make up the differential signal $X(t)$. A similar statement applies to the other differential signals. The notation is simplified by not explicitly writing out the two components of the various differential signals. If embodiments are considered in which the various signals are single-ended signals, then the various variables may be thought of as scalars. In this way, the above formalism for representing signals applies regardless of whether an embodiment employs differential signaling or single-ended signaling.

The phase-interpolated clock signal provided by phase interpolator 112 is fed into clock distribution network 116. In the particular embodiment of FIG. 1, clock distribution network 116 is a clock tree, and will be referred as such. Other embodiments may employ other types of distribution networks. The output of clock tree 116 is a single-ended signal, which provides clocking to data receiver 105. During an initialization or training period, slave delay line 110 and phase interpolator 112 are adjusted so that the clock signal on clock input port 115 is in-phase with the received differential clock signal. However, once the initialization period is over, the characteristics of clock tree 116 may shift due to temperature changes, as well as other factors, such as noise in the supply voltage. In such cases, the clocking of data receiver 105 may not be optimum because the rising edge of the clock signal provided by clock tree 116 may not coincide with the eye of the data signal received by data receiver 105. To mitigate these effects, a control loop comprising phase interpolator 114, clock distribution network (clock tree) 118, data receiver 120, and control logic 122, is utilized.

Clock tree 118 is designed to match clock tree 116, and data receiver 120 is designed to match data receiver 105. Input ports 124 and 126 of data receiver 120 are connected to pads (input ports) 102 and 104, respectively, so that the differential input signal to data receiver 120 is the received differential clock signal. The single-ended output signal from clock tree 118 is used to clock data receiver 120.

Figure 2:
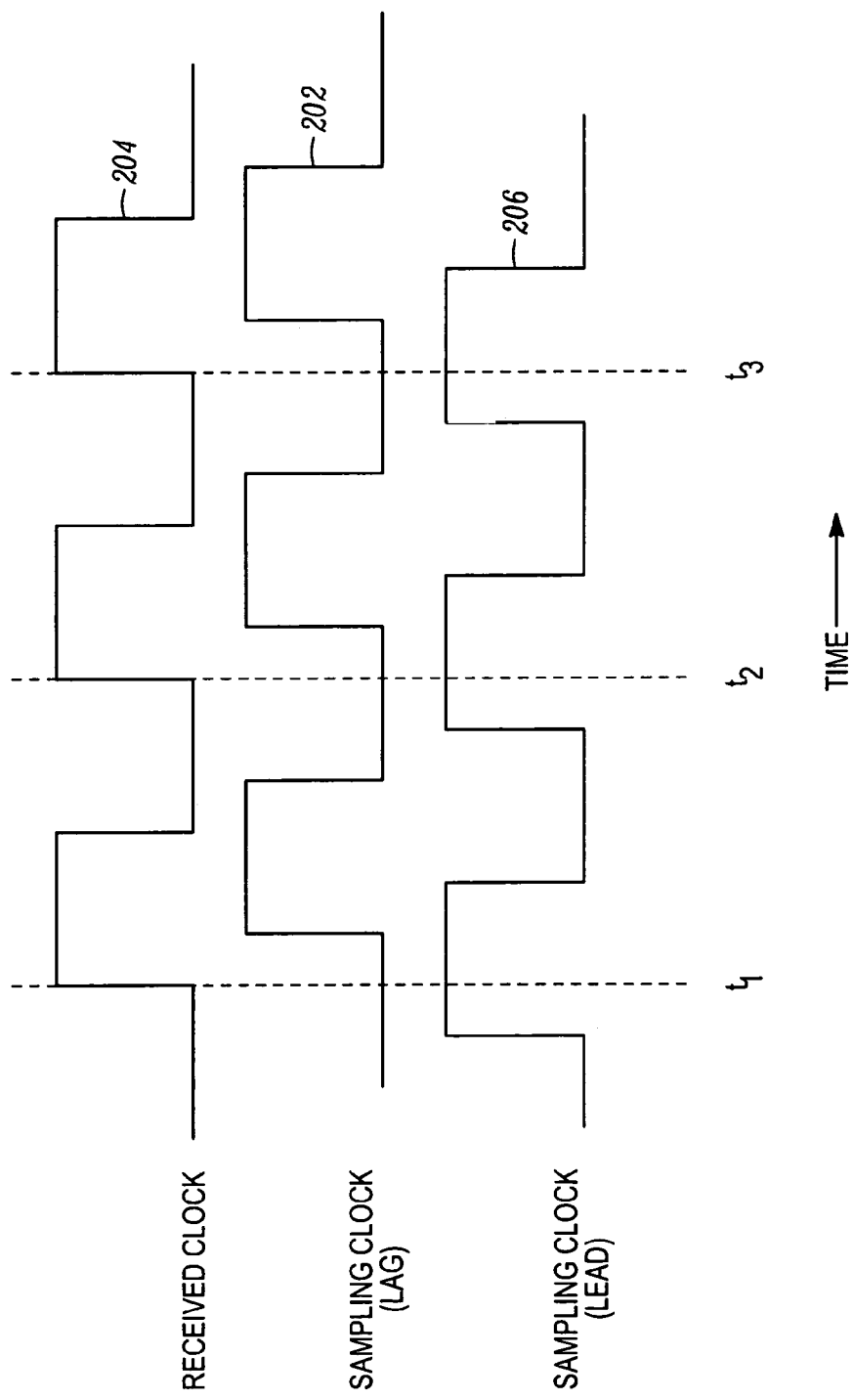
FIG. 2 illustrates lagging and leading sampling clock signals, relative to a received clock signal, as may occur in the embodiment of FIG. 1.

In the embodiment of FIG. 1, data receiver 120 latches its input signal on the rising edge of the clock signal applied to clock input port 128. For convenience, the clock signal provided by clock tree 118 will be referred to as the sampling clock signal. When the sampling clock signal lags the received clock signal at pads 102 and 104, the output of data receiver 120 is always a logical 1, or HIGH. This is easily observed by considering the example of FIG. 2, where times $t_1$, $t_2$, and $t_3$ mark the rising edges of a received clock signal, labeled as 204. A sampling clock signal that lags received clock signal 204 is labeled as 202. As seen in FIG. 2, the rising edges of sampling clock signal 202 lag the rising edges of received clock signal 204. Because received clock signal 204 is always HIGH at the rising edge of lagging sampling clock signal 202, the output of data receiver 120 is a logical 1.

When the sampling clock signal leads the received clock signal at pads 102 and 104, the output of data receiver 120 is always a logical 0, or LOW. This is easily observed by again considering FIG. 2, where the rising edges of a leading sampling clock signal, labeled as 206, lead the rising edges of received clock signal 204. Because received clock signal 204 is always LOW at the rising edges of leading sampling clock signal 206, the output of data receiver 120 is a logical 0.

Based upon the output samples of data receiver 120, control logic 122 adjusts the phase interpolation of phase interpolator 114. If the output samples indicate that the sampling clock signal lags the received clock signal, then phase interpolator 114 is adjusted so that the phase angle θ is reduced. If, however, the output samples indicate that the sampling clock signal leads the received clock signal, then phase interpolator 114 is adjusted so that the phase angle θ is increased.

Latch 132 samples the output samples of data receiver 120 at a rate determined by clocking signal UPDATE. Sampling at a rate less than the received clock rate may be needed if the logic circuits in control logic 122 are operated at a lower frequency than the frequency of the received clock signal. As a result, a subset of the output samples of data receiver 120 may be made available to phase interpolator control logic 130. It is to be understood that a subset need not be a proper subset, so that for the case in which the clocking signal UPDATE is at the same rate as the received clock signal, all of the output samples may be made available to phase interpolator control logic 130. Regardless of whether all or a proper subset of the output samples of data receiver 120 are available to phase interpolator control logic 130, for some embodiments phase interpolator control logic 130 may processes only a proper subset of the output samples.

Generally, control logic 122 may be viewed as a mapping from a subset of the output samples of data receiver 120 to some value Δ, where the phase θ is changed to θ+Δ. Many such mappings are possible. For example, for some embodiments, phase interpolator control logic 130 may process a sliding window of output samples, and decrease the phase if there are more logical 1's than 0's, and increase the phase otherwise. For some embodiments, the value Δ by which the phase is increased or decreased may depend upon the relative number of logical 1's to logical 0's.

For some embodiments, phase interpolator control logic 130 may apply a low pass filter to the output samples of data receiver 120, and map the output of such a filter to a digital control word applied to phase interpolator 114. For such embodiments employing a filter, the output samples of data receiver 120 may be mapped to numbers, whereupon the filter is applied to the numbers. As one example, a logical 1 is mapped to the number 1, and a logical 0 is mapped to the number 0. As another example, a logical 1 is mapped to the number 1, and a logical 0 is mapped to the number −1. Low pass filter designs based upon such mappings are, of course, well known. For some embodiments, phase interpolator control logic 130 may apply an IIR (Infinite Impulse Response) filter to the mapped output samples of data receiver 120, where the filter memory is an exponentially decaying window. Or, a FIR (Finite Impulse Response) filter may be employed, where a sliding window is used to sum a fixed number of output samples.

In theory, when the sampling clock signal is exactly in phase with the received clock signal, then the output of data receiver 120 is indeterminate. In practice, though, some jitter is always present, and the sampling clock signal cannot be exactly matched to the received clock signal. As a result, when the control loop in FIG. 1 has adjusted phase interpolator 114 so that the sampling clock signal is substantially matched to the received clock signal, it is expected that the probability that the output of data receiver 120 is a logical 1 (or logical 0) is one-half.

Control logic 122 adjusts phase interpolator 112 in the same way that it adjusts phase interpolator 114. That is, if phase interpolators 112 and 114 introduce a phase shift of θ, and control logic 122 were to adjust phase interpolator 114 so that it introduces a phase shift θ+Δ, then control logic 122 would also adjust phase interpolator 112 by the same value Δ so that interpolator 112 introduces a phase shift of θ+Δ.

Clock tree 116 is matched to clock tree 118. Furthermore, data receiver 120 is matched to data receiver 105. Note that by matching data receivers 120 and 105, clock tree 118 is loaded by a load have substantially the same impedance as the load for clock tree 116. As a result, it is expected that the clock signal applied to clock input port 115 on data receiver 105 will be forced by the control loop to be in phase with the received clock signal on pads 102 and 104.

Figure 3:
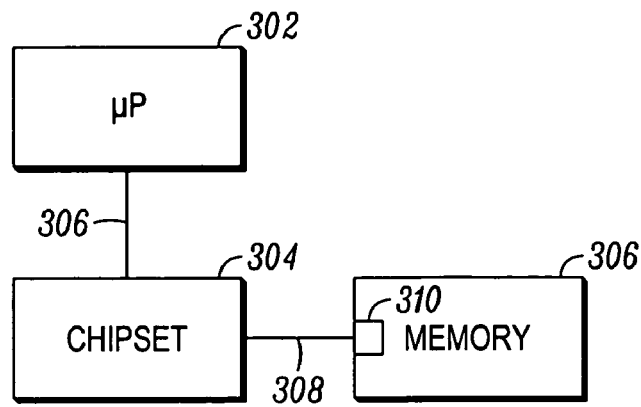
FIG. 3 illustrates a portion of a computer system in which embodiments of the present invention may find application.
Figure 4:
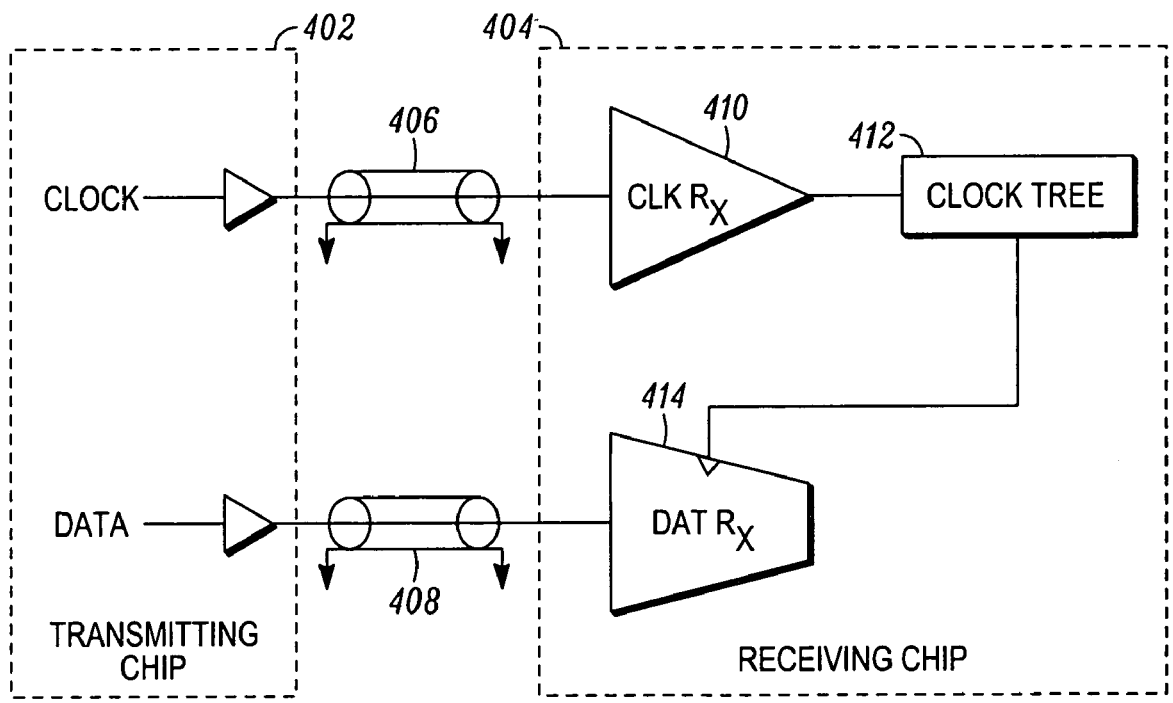
FIG. 4 illustrates prior art chip-to-chip communication.

Embodiments of the present invention are expected to find applications to various types of components, used in a wide range of systems. One such example is the computer system of FIG. 3. FIG. 3 illustrates, at a high level, a portion of a computer system, where microprocessor 302 communicates to chipset 304 by way of front side bus 306, and chipset 304 communicates to memory 306 by way of communication channel 308. Embodiments of the invention, labeled as 310 in FIG. 3, may find application to memory 306. When data is being written to memory 306, chipset 304 may be viewed as a transmitting chip, and memory 306 as a receiving chip, where communication channel 308 comprises a plurality of transmission lines for propagating a clock signal from chipset 304 to memory 306, as well as one or more data signals from chipset 304 to memory 306.

For simplicity, other typical computer components are not shown in FIG. 3. Chipset 304 may comprise one or more discrete integrated circuit chips, or may be integrated with microprocessor 302. One: of the functions of chipset 304 is that of a memory controller. Chipset 304 may comprise functional units other than a memory controller. Some, or all, of the functional units of chipset 304 may be integrated with microprocessor 302. Memory 306 may represent a hierarchy of memory.

Embodiments of the present invention may find application to memory 306, where communication channel, or transmission lines, 308 provide a forwarded clock signal and multi-bit data to memory 306. In high performance systems, a control loop according to an embodiment of the present invention is expected to help synchronize the phase of a distributed clock signal to a received clock signal, so that relatively high data rates may be achieved. Embodiments of the present invention may also find application to other system components, such as chipset 304.

Various modifications may be made to the disclosed embodiments without departing from the scope of the invention as claimed below. For example, the embodiments represented by FIG. 1 utilize differential signals. However, the disclosed embodiments are easily modified to utilize single-ended signals.

It is to be understood in these letters patent that the meaning of "A is connected to B", where A or B may be, for example, a node or device terminal, is that A and B are connected to each other so that the voltage potentials of A and B are substantially equal to each other. For example, A and B may be connected together by an interconnect (transmission line). In integrated circuit technology, the interconnect may be exceedingly short, comparable to the device dimension itself. For example, the gates of two transistors may be connected together by polysilicon, or copper interconnect, where the length of the polysilicon, or copper interconnect, is comparable to the gate lengths. As another example, A and B may be connected to each other by a switch, such as a transmission gate, so that their respective voltage potentials are substantially equal to each other when the switch is ON.

It is also to be understood in these letters patent that the meaning of "A is coupled to B" is that either A and B are connected to each other as described above, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

It is also to be understood in these letters patent that various circuit blocks, such as current mirrors, amplifiers, etc., may include switches so as to be switched in or out of a larger circuit, and yet such circuit blocks may still be considered connected to the larger circuit because the various switches may be considered as included in the circuit block.

Various mathematical relationships may be used to describe relationships among one or more quantities. For example, a mathematical relationship or mathematical transformation may express a relationship by which a quantity is derived from one or more other quantities by way of various mathematical operations, such as addition, subtraction, multiplication, division, etc. Or, a mathematical relationship may indicate that a quantity is larger, smaller, or equal to another quantity. These relationships and transformations are in practice not satisfied exactly, and should therefore be interpreted as "designed for" relationships and transformations. One of ordinary skill in the art may design various working embodiments to satisfy various mathematical relationships or transformations, but these relationships or transformations can only be met within the tolerances of the technology available to the practitioner.

Accordingly, in the following claims, it is to be understood that claimed mathematical relationships or transformations can in practice only be met within the tolerances or precision of the technology available to the practitioner, and that the scope of the claimed subject matter includes those embodiments that substantially satisfy the mathematical relationships or transformations so claimed.

What is claimed is:

1. A circuit comprising:
   a data receiver to receive a clock signal, and comprising an output port to provide output samples;
   a phase interpolator to provide a phase-interpolated clock signal based on the clock signal;
   a clock distribution network to distribute the phase-interpolated clock signal to provide a sampling clock signal to clock the data receiver; and
   control logic to process the output samples to adjust the phase interpolation of the phase interpolator.

2. The circuit as set forth in claim 1, the phase-interpolated clock signal having a phase, the control logic to adjust the phase interpolator to decrease the phase of the phase-interpolated clock signal if the output samples are indicative that the sampling clock signal lags the clock signal, and to adjust the phase interpolator to increase the phase of the phase-interpolated clock signal if the output samples are indicative that the sampling clock signal leads the clock signal.

3. The circuit as set forth in claim 2, further comprising:
   a second data receiver matched to the data receiver, the second data receiver to receive a data signal;
   a second phase interpolator matched to the phase interpolator, to provide a second phase-interpolated clock signal based on the clock signal; and
   a second clock distribution network matched to the clock distribution network to distribute the second phase-interpolated clock signal to provide a second sampling clock signal to clock the second data receiver.

4. The circuit as set forth in claim 3, the control logic to adjust the phase interpolator and the second phase interpolator by a same value.

5. The circuit as set forth in claim 1, further comprising:
   a second data receiver matched to the data receiver, the second data receiver to receive a data signal;
   a second phase interpolator matched to the phase interpolator, to provide a second phase-interpolated clock signal based on the clock signal; and
   a second clock distribution network matched to the clock distribution network to distribute the second phase-interpolated clock signal to provide a second sampling clock signal to clock the second data receiver.

6. The circuit as set forth in claim 5, the control logic to adjust the phase interpolator and the second phase interpolators by a same value.

7. The circuit as set forth in claim 1, the control logic comprising a low pass filter to filter a subset of the output samples.

8. The circuit as set forth in claim 7, the clock signal having a frequency, the control logic comprising a latch to sample the output samples at an update rate less than the clock signal frequency.

9. The circuit as set forth in claim 1, wherein the clock signal is a differential signal.

10. The circuit as set forth in claim 1, wherein the clock distribution network is a clock tree.

11. A circuit comprising:
   a data receiver to receive a clock signal having a period T;
   a phase interpolator to provide a phase-interpolated clock signal $X(t+(T/2\pi)\theta)$ based on the clock signal, where $\theta$ is a phase;
   a clock distribution network comprising an input port to receive the phase-interpolated clock signal $X(t+(T/2\pi)\theta)$, and an output port to provide a sampling clock signal to clock the data receiver so that the data receiver provides output samples; and
   control logic to map a subset of the output samples to a value $\Delta$ to change the phase $\theta$ of the phase-interpolated clock signal to $\theta+\Delta$.

12. The circuit as set forth in claim 11, the control logic to decrease the phase $\theta$ when the output samples indicate that the sampling clock signal lags the clock signal, and to increase the phase otherwise.

13. The circuit as set forth in claim 12, he control logic to map the subset of output samples to a set of numbers, and comprising a low pass filter to filter the set of numbers to provide a filtered value, the control logic to adjust the phase $\theta$ of the phase interpolator depending upon the filtered value.

14. The circuit as set forth in claim 11, further comprising:
   a second data receiver to receive a data signal;
   a second phase interpolator to provide a second phase-interpolated clock signal $X_2(t+(T/2\pi)\theta)$ based on the clock signal, where $\theta$ is the phase of the second phase interpolator; and
   a second clock distribution network comprising an input port to receive the second phase-interpolated clock signal $X_2(t+(T/2\pi)\theta)$, and an output port to provide a second sampling clock signal to clock the second data receiver;
   the control logic to adjust the second phase interpolator to have a phase $\theta+\Delta$ if the phase of the first phase interpolator is changed to $\theta+\Delta$.

15. The circuit as set forth in claim 14, wherein the second clock distribution network is matched to the clock distribution network.

16. The circuit as set forth in claim 15, wherein the second data receiver is matched to the data receiver.

17. The circuit as set forth in claim 11, wherein the clock signal and the phase-interpolated clock signal $X(t+(T/2\pi)\theta)$ are differential signals.

18. A system comprising:
   a microprocessor;
   a chipset coupled to the microprocessor; and
   system memory coupled to the chipset, comprising:
   a data receiver to receive a clock signal having a period T;
   a phase interpolator to provide a phase-interpolated clock signal $X(t+(T/2\pi)\theta)$ based on the clock signal, where $\theta$ is a phase;
   a clock distribution network comprising an input port to receive the phase-interpolated clock signal $X(t+(T/2\pi)\theta)$, and an output port to provide a sampling clock signal to clock the data receiver so that the data receiver provides output samples; and
   control logic to map a subset of the output samples to a value $\Delta$ to change the phase $\theta$ of the phase-interpolated clock signal to $\theta+\Delta$.

19. The system as set forth in claim 18, the control logic to decrease the phase $\theta$ when the output samples indicate that the sampling clock signal lags the clock signal, and to increase the phase otherwise.

20. The system as set forth in claim 19, the control logic to map the subset of output samples to a set of numbers, and comprising a low pass filter to filter the set of numbers to provide a filtered value, the control logic to adjust the phase $\theta$ of the phase interpolator depending upon the filtered value.

21. The system as set forth in claim 18, further comprising:
   a second data receiver to receive a data signal;
   a second phase interpolator to provide a second phase-interpolated clock signal $X_2(t+(T/2\pi)\theta)$ based on the clock signal, where $\theta$ is the phase of the second phase interpolator; and
   a second clock distribution network comprising an input port to receive the second phase-interpolated clock signal $X_2(t+(T/2\pi)\theta)$, and an output port to provide a second sampling clock signal to clock the second data receiver;
   the control logic to adjust the second phase interpolator to have a phase $\theta+\Delta$ if the phase of the first phase interpolator is changed to $\theta+\Delta$.

22. The system as set forth in claim 21, wherein the second clock distribution network is matched to the clock distribution network.

23. The system as set forth in claim 22, wherein the second data receiver is matched to the data receiver.

24. The system as set forth in claim 18, wherein the clock signal and the phase-interpolated clock signal $X(t+(T/2\pi)\theta)$ are differential signals.

25. The system as set forth in claim 18, wherein a portion of the chipset is integrated with the microprocessor.

* * * * *